nt Number: 5,206,722

United States Patent [19]
Kwan

[11] Patent Number: 5,206,722
[45] Date of Patent: Apr. 27, 1993

[54] REMOTE CHANNEL SWITCHING FOR VIDEO ON DEMAND SERVICE

[75] Inventor: Shue-Yu Kwan, Parsippany, N.J.

[73] Assignee: AT&T Bell Laboratories, Murray Hill, N.J.

[21] Appl. No.: 635,044

[22] Filed: Dec. 28, 1990

[51] Int. Cl.[5] .............................................. H04H 1/02
[52] U.S. Cl. ...................................... 358/86; 455/4.2; 455/6.2
[58] Field of Search .................... 455/3.1, 4.1, 4.2, 5.1, 455/6.1, 6.2; 358/86, 181; 380/7, 10

[56] References Cited

U.S. PATENT DOCUMENTS

| | | | |
|---|---|---|---|
| 4,446,458 | 5/1984 | Cook | 340/825.06 |
| 4,554,584 | 11/1985 | Elam et al. | 358/165 |
| 4,823,386 | 4/1989 | Dumbauld et al. | 380/13 |
| 4,947,244 | 8/1990 | Fenwick et al. | 358/86 |
| 4,995,075 | 2/1991 | Monslow et al. | 455/3.1 X |

Primary Examiner—Reinhard J. Eisenzopf
Assistant Examiner—Chi H. Pham
Attorney, Agent, or Firm—R. B. Anderson

[57] ABSTRACT

VOD services are provided by providing at each subscriber location a switching apparatus (e.g., 23 of FIG. 2) which is remotely controlled from the head end (12) of the system. A set top box of each subscriber is provided with a single channel designation (X) for VOD reception. In response to a request from a subscriber for a particular TV program at a specified time, the provider at the head end actuates the switching apparatus (23) to permit the set top box to be tuned to a specified channel that corresponds to a channel upon which the requested VOD program will be transmitted. Then, when the subscriber selects on his set top box the single VOD channel designation (X), the set top box is capable of receiving the requested TV program on the specific TV channel of the transmission line (11) that has been designated for it by the provider at the head end.

12 Claims, 2 Drawing Sheets 5,206,722

REMOTE CHANNEL SWITCHING FOR VIDEO ON DEMAND SERVICE

TECHNICAL FIELD

This invention relates to methods and apparatus for providing premium community antenna television or cable television (CATV) services and, more particularly, to methods and apparatus for providing video on demand (VOD) CATV services.

BACKGROUND OF THE INVENTION

CATV services are normally provided by transmitting a plurality of television (TV) programs from a head end over television channels of a transmission line to a plurality of subscribers. The services provider normally supplies a set top box (STB) at each subscriber location for permitting reception of any of the desired channels by the television receiver of the subscriber. The set top box customarily comprises a tuner and a subscriber interface and display which permit the subscriber to designate desired TV channels by a mechanism that adjusts the tuner.

In addition, the provider may transmit from the head end a plurality of scrambled TV programs over a plurality of premium TV channels. Those subscribers which, for an added fee, are permitted to receive premium channels, have included in their set top boxes descramblers for permitting programs transmitted by the premium channel to be coherently received. In addition, pay-per-view (PPV) is a service sometimes provided to enable paying subscribers to watch a scheduled event at a particular time. This service may require, for example, that the subscriber communicate by telephone to the provider at the head end a request that he be permitted access to the scheduled event, whereupon the provider remotely actuates the descrambler at that subscriber's set top box permitting him to receive the scheduled event on a specified TV channel.

A service which is not currently available may be designated video on demand (VOD) service. With this service, a subscriber would communicate to the provider a request for a specified program, such as a videotaped movie, at a specified time. The provider would transmit the program or movie to the subscriber in a manner such that it could be received during the specified time only by the single subscriber requesting and paying for it, without reception by others. One way of providing such service would be to dedicate a plurality of premium channels for VOD service, and then to notify the subscriber which particular VOD channel he should select in order to receive the requested program. The provider would also activate the descrambler at the subscriber's set top box to permit reception of the transmitted movie. A disadvantage of this system is that, if there were many subscribers and many dedicated channels, it would require that the subscriber be advised which of many channels he should select at the desired time to receive the requested TV program. Another possible system for providing VOD service would include a switching system between the head end and the subscribers for switching an appropriate channel carrying a requested program at a proper time to the appropriate subscriber. This would be disadvantageous because it would require a significant capital expenditure. Thus, there is a long-felt need in the industry for a method for providing video on demand services to subscribers in a way that is simple and easy for the subscriber to use and which is relatively inexpensive to provide.

SUMMARY OF THE INVENTION

VOD services are provided, in accordance with the invention, by providing at each subscriber location a switching apparatus which is remotely controlled from the head end of the system. The set top box of each subscriber is provided with a single channel designation for VOD reception. In response to a request from the subscriber for a particular TV program at a specified time, the provider at the head end actuates the switching apparatus to permit the set top box to be tuned to a specified channel that corresponds to a channel upon which the requested VOD program will be transmitted. Then, when the subscriber selects on his set top box the single VOD channel designation, the set top box is capable of receiving the requested TV program on the specific TV channel of the transmission line that has been designated for it by the provider at the head end.

A number of the TV channels of the transmission line are designated as VOD channels. Thus, many different subscribers can be viewing different programs simultaneously even though only a single channel designation is used for VOD reception. The subscriber does not know which of the various VOD channels of the transmission line is being accessed by his single VOD channel designation.

As will become clear from the following description, two of the main advantages of the invention are its low capital cost and its ease of use. Each set top box can easily be modified to provide the required remotely controlled switching capability so as to permit access by the subscriber to any of a plurality of VOD channels by a single channel designation. After the expiration of the allotted time for the VOD program, the switching apparatus in the set top box can be operated from the head end to decouple the set top box from the VOD channels. Alternatively, the set top box may contain a memory element that can be programmed to provide the required decoupling at the appropriate time. Thus, only a single operation from the head end is required for providing the requested VOD program to the appropriate subscriber and then returning the subscriber's set top box to its original state.

These and other objects, features and benefits of the invention will be better understood from a consideration of the following detailed description taken in conjunction with the accompanying drawing.

DETAILED DESCRIPTION

Figure 1:
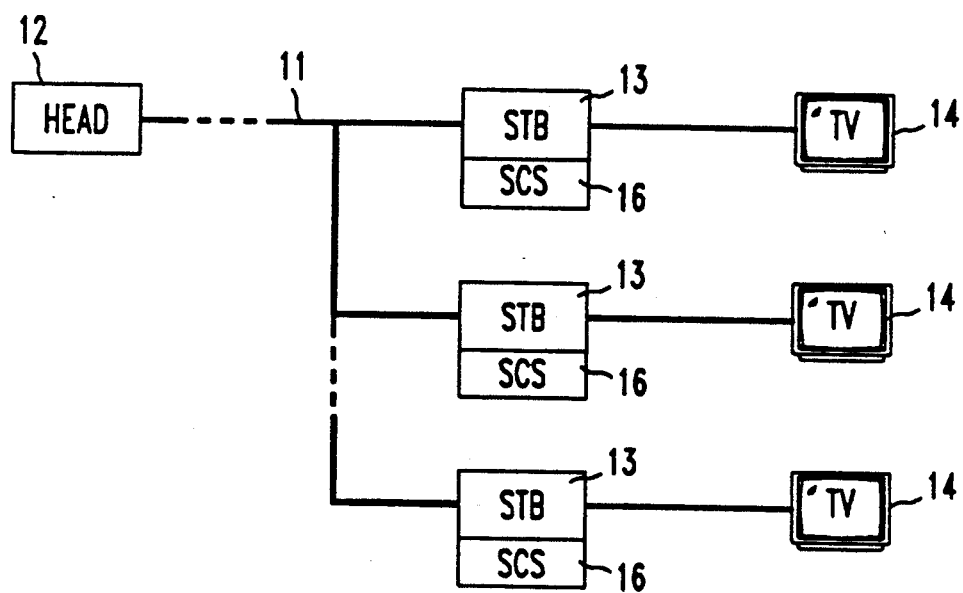
FIG. 1 is a schematic block diagram of a CATV system in accordance with an embodiment of the invention.

Referring now to FIG. 1, there is shown a CATV system in accordance with the invention comprising a transmission line 11 connected at one end to head end apparatus 12 and at another end to each of a plurality of set top boxes 13, each at a separate subscriber location.

Each set top box includes a display and interface which permits the subscriber to select any of a plurality of non-premium television (TV) channels for display by a corresponding TV set or TV receiver 14. In addition to the non-premium channels, a plurality of TV channels of the transmission line 11 may also be dedicated to premium channels for transmitting premium TV programs in a scrambled format. The set top box 13 of each subscriber that pays an appropriate fee, typically a monthly fee, contains a descrambler permitting reception of those premium channels for which the additional fee has been paid. The system may also include one or more pay-per-view (PPV) channels over which the subscriber may receive a single scheduled event such as a sporting event. Those subscribers agreeing to pay to receive the scheduled event have the descramblers in their corresponding set top boxes adjusted by a signal from the head end to permit them to receive the event. Typically, for a specific scheduled event, a plurality, but not all, of the subscribers of the system would request the event and would therefore have their corresponding descramblers activated to permit coherent reception. Those requesting the PPV event typically pay a single fee for its reception and those not receiving the scheduled event would receive only a scrambled signal over the PPV channel providing it.

In accordance with the invention, the CATV system of FIG. 1 is designed to provide an additional service, namely, a video on demand (VOD) service. Associated with each set top box is a secondary channel selection mechanism 16, which is remotely controlled from the head end. The primary channel selection mechanism of the set top box 13 includes a single channel designation for VOD service. When this channel selection is made by the subscriber, and when the operator at the head end activates the secondary channel selection appropriately, the subscriber will receive a requested TV program during the time period requested. Thereafter, the secondary channel selection mechanism 16 disconnects the set top box from VOD channels to prohibit subsequent reception of any VOD programs.

Figure 2:
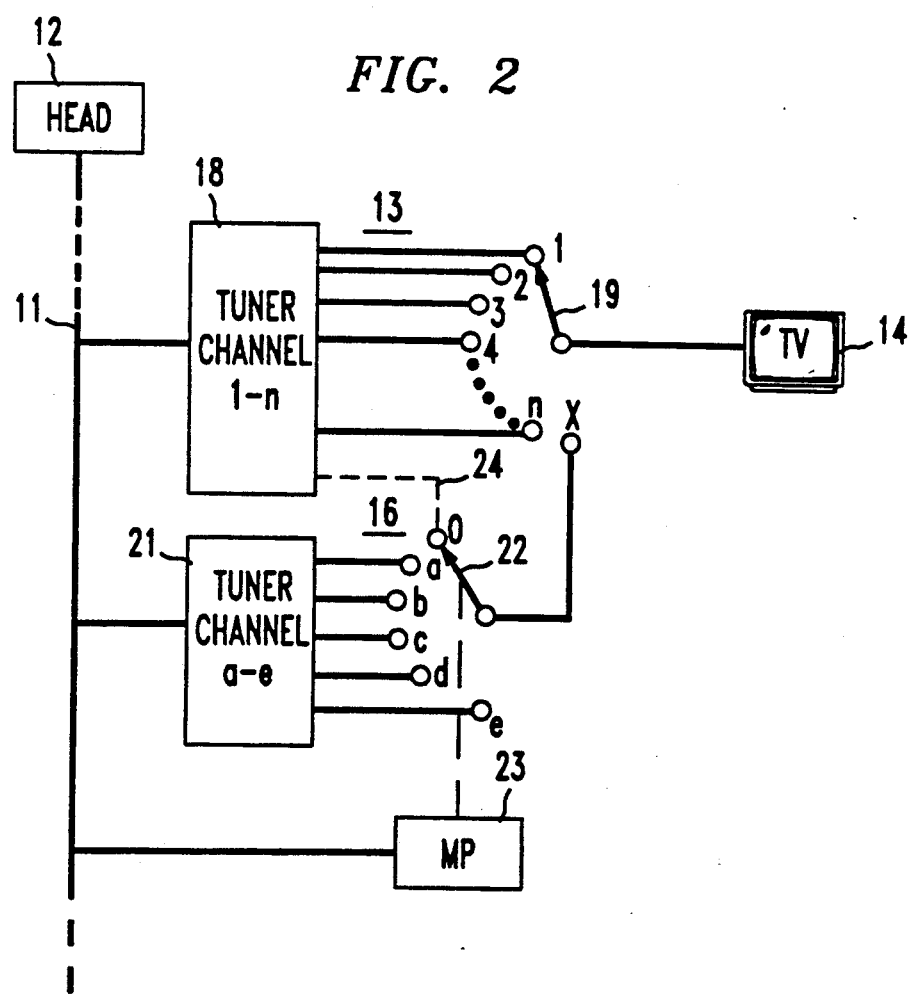
FIG. 2 is a schematic view of illustrative secondary channel selection apparatus that may be used in the system of FIG. 1.

The function of the conventional set top box 13 and the secondary channel selection mechanism 16 are depicted in FIG. 2. The set top box includes a conventional tuner 18 which is connected to TV receiver 14 through a switch 19. Each of the contacts 1–n of the switch 19 is operative to tune the tuner 18 to any of the non-premium channels 1–n. Thus, when the subscriber turns switch 19 to the channel designated number 3, the tuner 18 is adjusted to be tuned to channel 3, one of the designated non-premium channels of transmission line 11, so that the television program carried on channel 3 can be displayed by the TV receiver 14. Certain other channels may be dedicated as premium channels or pay per view channels but, for brevity, these have not been separately designated in the diagram of FIG. 2. The term "TV channel" means a band of video frequencies which are suitable for transmitting sufficient information to permit reconstruction of the video image and the audio sound by the TV receiver 14.

In addition to the non-premium channels, VOD channels a–e are also dedicated on transmission line 11 and may be received by tuner 21. Contact X of switch 19 is connected to a switch 22 of the secondary channel selection mechanism 16. Thus, when switch 19 contacts the contact or channel designation X, and when switch 22 contacts contact b, tuner 21 is adjusted to receive channel b from transmission line 11 and channel b information is transmitted via switches 22 and 19 to TV receiver 14. Switch 22 is controlled by a microprocessor 23 which, in turn, is controlled by signals from the head end 12. The contacts a–e represent the VOD channels that may be accessed by the tuner 21, while contact O of switch 22 does not access any of the VOD channels. Contact O of switch 22 may be connected, if desired, as shown by dotted line 24, to tuner 18 so that when switch 22 is in its normal unswitched condition, selection of channel X by the subscriber through the use of switch 19 will connect the TV set 14 to one of the non-premium channels of tuner 18.

In operation, the subscriber at the subscriber location depicted in FIG. 2 communicates with the provider or operator at the head end 12 a request for a particular program such as a taped movie at a particular time, such as between 8:00 and 10:00 p.m. of that day. The provider at the head end determines that one of the VOD channels a–e, e.g. channel c, is available during that time period and agrees that a VOD channel shall be provided during the requested time period to carry the movie selection. Prior to 8:00 p.m., the operator at the head end designates channel c to transmit the requested movie and actuates microprocessor 23 to interconnect switch 22 to the desired VOD channel, channel c. At 8:00 p.m., the operator at the head end commences transmission of the desired movie over VOD channel c of transmission line 11. Also, at about 8:00 p.m., the subscriber adjusts switch 19 to the channel designation X, whereupon a completed circuit is made to permit the movie to be displayed by the subscriber's TV receiver 14. Other subscribers would not be able to receive the movie because their corresponding switches 22 would not have been switched to make contact with VOD channel c. At 10:00 p.m., the termination of the requested time period, the operator at the head end remotely actuates microprocessor 23 to return switch 22 so as to contact channel 0. Channel 0 may be a blank channel, or as mentioned before, may be connected so as to receive a non-premium channel; in particular, it may receive a channel of the type known in the industry as a "barker" channel, which continuously broadcasts music, information concerning weather, or some other subject matter that is considered non-premium. During the time period that the subscriber of FIG. 2 is receiving the movie transmitted on channel c, other subscribers can receive other VOD programs over other ones of the VOD channels a–e.

While the hardware depicted in FIG. 2 is useful for illustrating the function of applicant's invention, it does not represent the preferred structure used with modern digitally controlled television distribution systems. For example, wiper switches are no longer customarily used for television channel designation. Different tuners for accessing different television channels would not normally be either necessary or expedient. One of the advantages of applicant's invention is that it can readily be incorporated by appropriate "firmware" modifications of the structure of existing set top boxes.

Figure 3:
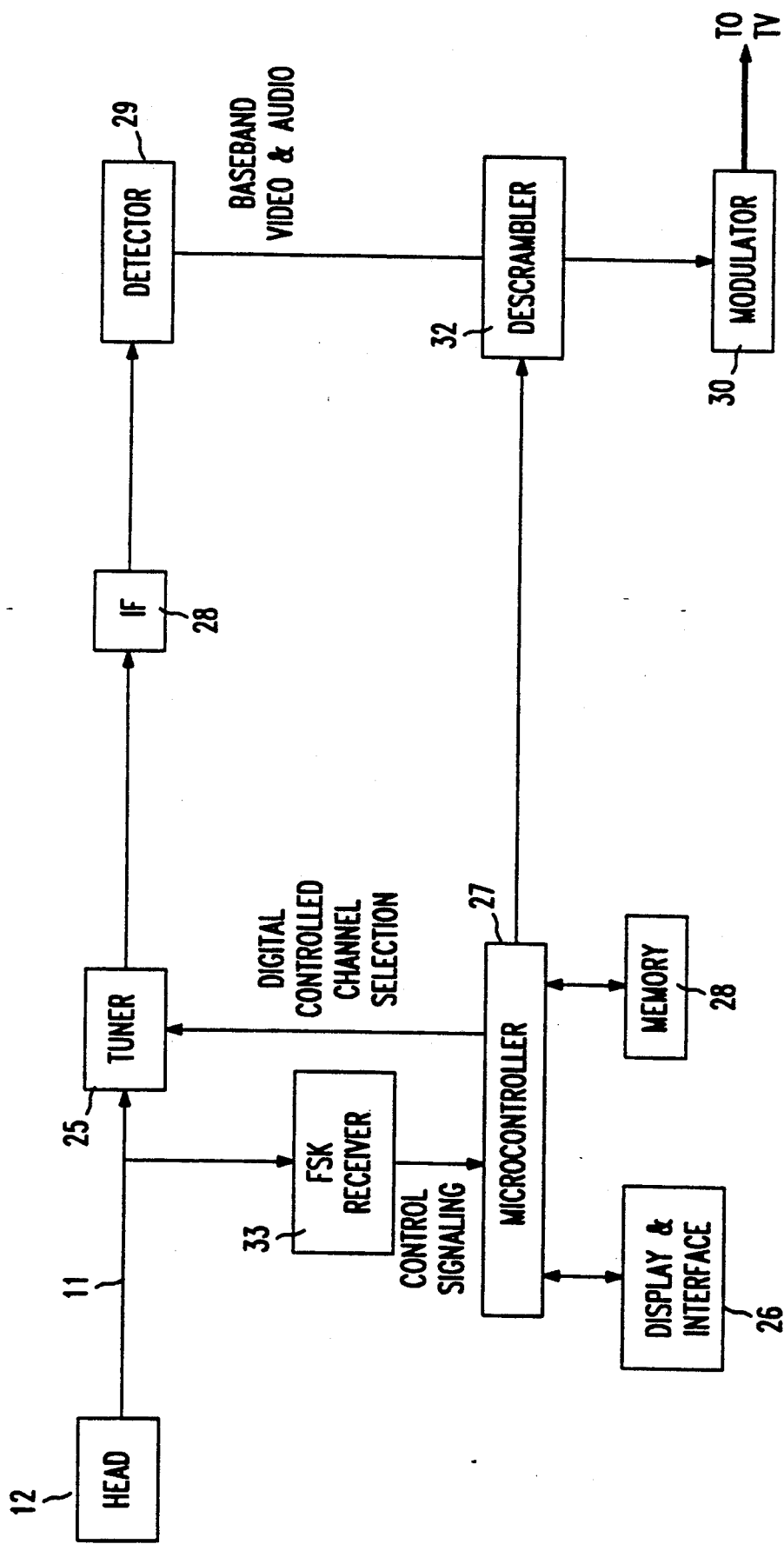
FIG. 3 is a schematic block diagram of a set top box and secondary channel selection mechanism in accordance with another embodiment of the invention.

Referring to FIG. 3, there is shown a set top box of a type that may be used in modern systems and which can be modified to provide the VOD services described above. The tuner 25 is capable of being tuned to all of the TV channels transmitted by transmission line 11. The subscriber selects the proper channel through the use of a push button keyboard on a display and interface component 26. A microcontroller 27 is responsive to the display and interface component 26 to adjust the tuner 25 to receive the selected TV channel. The detected signal is directed to a mixer 28 where it is mixed to generate an intermediate frequency (IF), a detector 29 and a modulator 30, each component processing the signal so that it can be displayed by a commercial TV receiver.

A descrambler 32 is included between the detector 29 and the modulator 30 for descrambling signals transmitted on premium channels which, in accordance with the prior art, may contain continuous premium programming or per-per-view programming. The descrambler is controlled from the head end by an appropriate signal containing an address portion actuating a frequency signal keying (FSK) receiver 33 which directs the signal to the microcontroller 27. The microcontroller 27 controls descrambler 32 to provide those descrambling functions instructed from the head end. For example, if the subscriber is entitled to receive a premium channel such as HBO (TM), an appropriate signal with an address portion that actuates FSK receiver 33 is sent from the head end for actuating descrambler 32 such as to permit descrambling of the HBO channel which may, for example, be channel 52. Thereafter, if the subscriber selects channel designation 52 through the interface component 26, the HBO premium channel will be displayed on his TV receiver. If he is not entitled to receive the HBO channel, selecting channel 52 will result in a scrambled and incoherent signal. Alternatively, the microcontroller 27 may be programmed to adjust tuner 25 so as to display a non-premium or "barker" channel when channel 52 is selected. A microcontroller is a device that typically includes a microprocessor plus random access memory (RAM) functions. Accordingly, its function could be performed by a microprocessor plus other associated circuitry, but the term "microcontroller" is used in FIG. 3 because that is the term commonly used for such devices in commercially available set top boxes.

In accordance with the invention, adjustments are made in the interconnections of microcontroller 27 so that it may perform the function illustrated in FIG. 2. In addition, a separate memory component 28 may be connected to the microcontroller 27 if the memory function included in the microcontroller is found to be inadequate, as will be described later. As with FIG. 2, a single channel designation is used by the subscriber for receiving any VOD channel. Thus, the system may include, for example, channels 1-50 as non-premium channels, channel 51 as a "barker" channel, channels 52-60 as conventional premium channels (e.g., HBO, etc.), channels 61-65 may be conventional pay-per-view channels and channels 65-999 may be video on demand (VOD) channels.

Although the selection of channel 51 normally tunes the tuner to the "barker" channel, microcontroller 27 is programmed so that, in response to an instruction from the head end received through FSK receiver 33, the channel 51 selection will tune tuner 25 to any of the VOD channels described by the instruction. Thus, for example, the subscriber may request from the operator at the head end a specific movie to be received that evening in the time period of 8:00 to 10:00 p.m. The subscriber would understand that the single VOD channel selection that he must make is channel 51. The operator would confirm his request after noting that a VOD channel, for example, channel 339, is available during that time period. Just prior to the time period, the operator would send an instruction to microcontroller 27 instructing a tuner adjustment to channel 339 in response to a channel designation on display and interface component 26 of channel 51. At 8:00 p.m., the operator at the head end would transmit the requested movie on VOD channel 339. The subscriber would receive the desired channel by selecting channel 51 on display and interface component 26.

As before, the operator at the head end could send a second signal at 10:00 p.m. for the purpose of changing the instruction so that a channel 51 selection would again adjust the tuner 25 to the channel 51 "barker" channel. Alternatively, and preferably, at the time of the initial instruction, the microcontroller 27, through the use of memory 28, is instructed to switch to normal operation at 10:00, that is, at the end of the selected time period. While the subscriber is watching the movie over channel 339, other subscribers may be watching any of several hundred other selections, each broadcast over other VOD channels of the system. Although the subscriber is viewing a program transmitted on channel 339, he is ignorant of that fact and is aware only that he must select the VOD channel, channel selection 51, prior to receiving the VOD program.

From the foregoing, it can be seen that a major advantage of the invention is that it can be used to provide VOD services with only minor modifications of conventional set top boxes. For example, most CATV systems provide premium channels, and accordingly most set top boxes are equipped with descramblers 32 operated in response to signals from the head end. This descrambler function is not changed through the use of VOD service. Each signal designating a VOD channel also activates the descrambler to descramble the VOD signal. The FSK receiver is included in the standard set top box. The difference is in the firmware provided to microcontroller 27 to permit the tuner 25 to be adjusted in accordance with a signal from the head end when the single VOD channel (channel 51) is designated by the subscriber. An additional memory unit 28 may be required to disconnect or switch off the VOD function at the expiration of the time period, but the memory apparatus included in the microcontroller may of itself be sufficient for this purpose. The separate memory unit 28 is included in FIG. 3 to emphasize that both the beginning and the end of the VOD function can easily be accomplished by a single set of signals from the head end. The programming or firmware adjustments of microcontroller 27 to accomplish the functions that have been described are within the skill of a worker in the art.

The various structures and functions that have been described are intended to be only illustrative of the inventive concept involved. For example, while it is convenient to refer to a "set top box" it is to be understood that the components thereof may be wired into the subscriber's TV receiver, rather than being contained in a separate "box"; accordingly, the term "set top box" should be taken as meaning that aggregate of instrumentalities normally supplied by the service provider to the subscriber, and/or those instrumentalities at the subscriber locations controlled by the service provider. Various modifications can be made by those skilled in the art without departing from the spirit and scope of the invention.

I claim:

1. A method for delivering from a head end of a television system selected VOD television programs to television subscribers, each having an assigned set top box for selecting any of a plurality of first TV channels of different frequency, comprising the steps of:

dedicating a plurality of second TV channels of different frequency to VOD programs, the second TV channels being different from the first TV channels;

providing each subscriber with a set top box that includes a single channel designation for VOD reception;

providing each set top box with remotely controlled switching apparatus for selectively making said single channel designation to be receptive of any of the second TV channels;

providing a plurality of programs on the second TV channels including the step of providing a first selected program on a first one of the second TV channels during a first selected time period specified by a first subscriber;

prior to the first selected time period, actuating from the head end the remotely controlled switching apparatus of the first subscriber so as to make the single channel designation of the set top box assigned to the first subscriber receptive of said first one of the second TV channels carrying the selected program;

and after the first selected time period, actuating the remotely controlled switching apparatus to make the VOD channel of the set top box assigned to the first subscriber substantially unreceptive of any of said second TV channels.

2. The method of claim 1 further comprising the steps of:

providing a second selected program on a second one of the second TV channels during a second time period specified by a second subscriber;

prior to the second time period, actuating from the head end the remotely controlled switching apparatus of the second subscriber so as to make the VOD channel designation of the set top box assigned to the second subscriber receptive of said second one of the second TV channels carrying the second selected program.

3. The method of claim 1 further comprising the steps of:

providing each of a plurality of second programs on each of a plurality of the second TV channels during each of a plurality of time periods specified by each of a plurality of subscribers;

prior to each of said plurality of time periods, actuating from the head end the remotely controlled switching apparatus of a corresponding subscriber so as to make the VOD channel designation of the set top box assigned to the corresponding subscriber receptive of a corresponding one of the second TV channels carrying the corresponding selected program.

4. The method of claim 3 wherein:

each remotely controlled switching apparatus includes a memory apparatus; and each of the remotely controlled switching apparatus of each subscriber and each of the memory apparatus of such subscriber is actuated from the head end prior to the time period selected by such subscriber such as to cause the VOD channel designation of the set top box assigned to such subscriber to be unreceptive of the corresponding one of the second TV channels after the time period selected by such subscriber.

5. A method for providing television programs from a head end of a CATV system by transmission line to a plurality of subscribers comprising the steps of: dedicating a plurality of first TV channels of the CATV system to non-premium programs; providing each subscriber with a set top box containing a tuner; each set top box containing a plurality of channel number selections; each of a plurality of the channel number selections being effective to adjust the tuner such that a TV receiver at the subscriber's location can receive any of a plurality of the first TV channels, characterized by the steps of:

dedicating a plurality of second TV channels of the CATV system to the transmission of a plurality of VOD programs, the second TV channels being different from said first TV channels;

providing a single channel number selection to each subscriber for VOD reception;

providing a remotely controlled switching apparatus at each set top box for selectively adjusting the tuner of such set top box to receive any of the second TV channels, the switching apparatus being remotely controlled from the head end;

in response to a request from a first subscriber for a first VOD program during a first time period, transmitting such first VOD program on a first one of the second TV channels during the first time period;

prior to the beginning of the first time period, actuating from the head end the switching apparatus of the set top box of the first subscriber such that the first subscriber can receive the first one of the second TV channels during the first time period, provided the aforesaid single channel number selection has been selected by the subscriber;

and after the end of the first time period, actuating the switching apparatus such that the first subscriber cannot receive the first one of the second TV channels.

6. The method of claim 5 further characterized by the steps of:

providing each of a plurality of VOD programs on each of a plurality of the second TV channels during each of a plurality of time periods specified by each of a plurality of subscribers;

prior to each of the time periods, actuating from the head end the remotely controlled switching apparatus of a corresponding subscriber so as to make the single channel number selection of the set top box assigned to the corresponding subscriber receptive of the corresponding one of the second TV channels carrying the VOD program selected by the corresponding subscriber.

7. The method of claim 6 further characterized in that:

each remotely controlled switching apparatus includes a memory function;

and each of the remotely controlled switching apparatus and each of the memory functions are actuated from the head end prior to the selected time period such as to cause the single channel number selection of the set top box assigned to the corresponding subscriber to be unreceptive of the corresponding one of the second TV channels after the selected time period.

8. A CATV system comprising: a transmission line interconnecting a head end with a plurality of subscriber ends; means at the head end for transmitting on the transmission line a plurality of non-premium programs on a plurality of first TV channels of the transmission line; a tuner at each subscriber end; means at each subscriber end comprising a channel selection mechanism for selectively adjusting the tuner to be receptive of any of the first TV channels so as to permit TV programs on any such selected TV channel to be displayed on a TV set at the subscriber end, wherein the improvement comprises:

means at the head end for a transmitting on the transmission line a plurality of VOD programs, each on one of a plurality of second TV channels of the transmission line, the second TV channels being different from the first TV channels;

each channel selection mechanism including a VOD channel designation;

a remotely controlled switching apparatus at each subscriber end which is controlled from the head end;

means comprising the VOD channel designation and the switching apparatus at each subscriber end for adjusting the tuner at such subscriber end to be receptive of a selected one of the second TV channels during a limited specified time period;

and means comprising the switching apparatus for adjusting the corresponding tuner to be unreceptive of any second TV channel after expiration of the limited specified time period.

9. The CATV system of claim 8 wherein:
the switching apparatus comprises a microprocessor.

10. The CATV system of claim 9 wherein:
the means for adjusting the tuner to be unreceptive after a time period comprises a memory element connected to the microprocessor.

11. The CATV system of claim 10 wherein:
the switching apparatus comprises a frequency signal key receiver;
the frequency signal key receiver being responsive to an address signal transmitted from the head end to permit actuation of the switching apparatus.

12. The CATV system of claim 8 wherein:
the tuner, channel selection mechanism and switching apparatus at each subscriber end are contained within a set top box.

* * * * *

UNITED STATES PATENT AND TRADEMARK OFFICE
CERTIFICATE OF CORRECTION

PATENT NO. : 5,206,722
DATED : April 27, 1993
INVENTOR(S) : S. Kwan

It is certified that error appears in the above—identified patent and that said Letters Patent is hereby corrected as shown below:

Column 8, line 35 "by the subscriber" should read --by the first subscriber--
Column 9, line 10 "end for a transmitting" should read --end for transmitting--.

Signed and Sealed this

Twenty-fifth Day of January, 1994

Attest:

BRUCE LEHMAN

*Attesting Officer*   *Commissioner of Patents and Trademarks*